Figure 1:
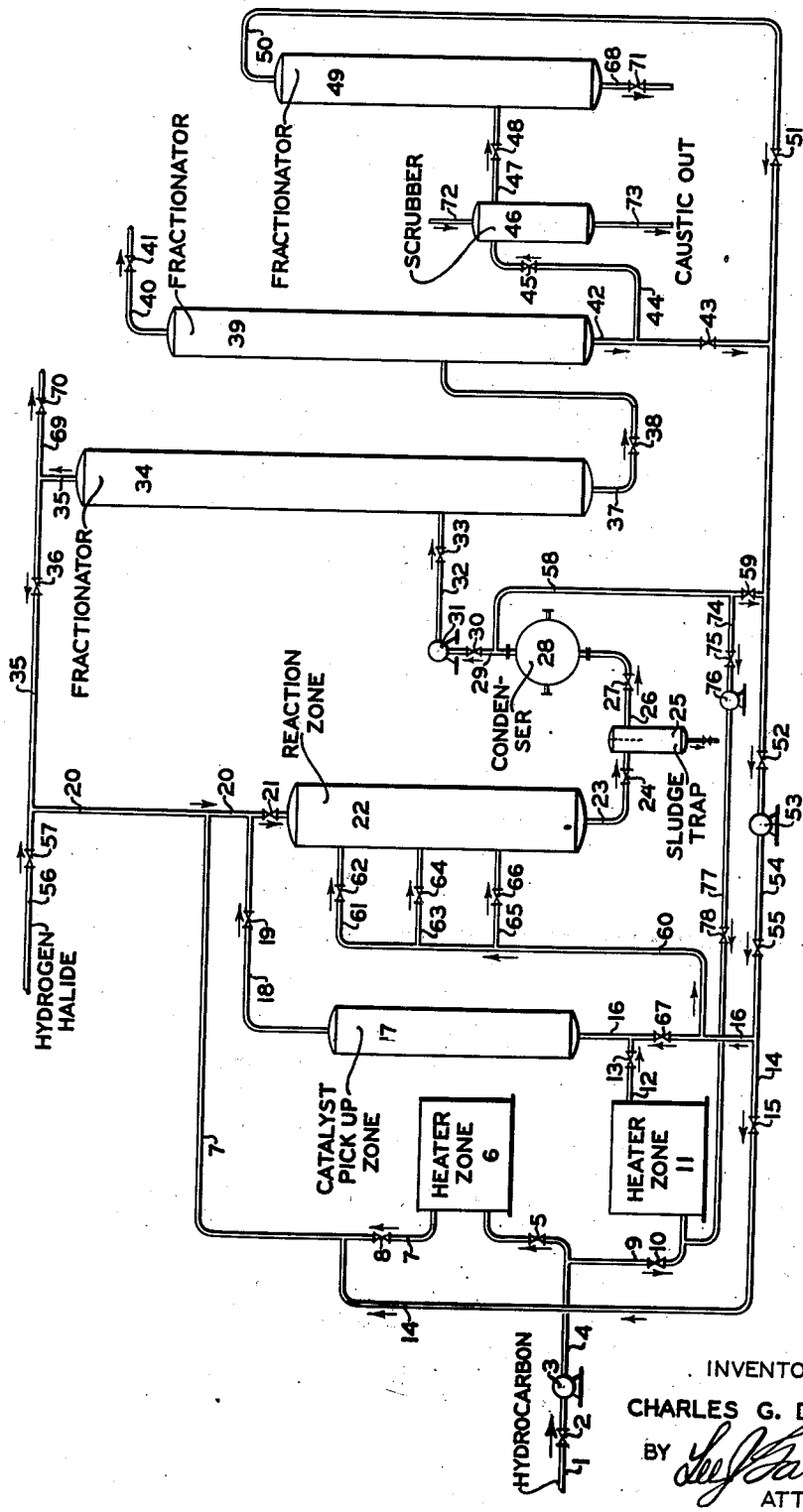

March 7, 1944.  C. G. DRYER  2,343,406
ISOMERIZATION OF PARAFFINS
Filed March 5, 1942  2 Sheets-Sheet 1

INVENTOR
CHARLES G. DRYER
BY
ATTORNEY

March 7, 1944. C. G. DRYER 2,343,406
ISOMERIZATION OF PARAFFINS
Filed March 5, 1942 2 Sheets-Sheet 2

INVENTOR
CHARLES G. DRYER
BY
ATTORNEY

Patented Mar. 7, 1944

2,343,406

UNITED STATES PATENT OFFICE 2,343,406

ISOMERIZATION OF PARAFFINS

Charles G. Dryer, Chicago, Ill., assignor to Universal Oil Products Company, Chicago, Ill., a corporation of Delaware Application March 5, 1942, Serial No. 433,433

14 Claims. (Cl. 260—683.5)

The present invention relates to the isomerization of paraffinic hydrocarbons and deals more specifically with a process wherein the catalyst concentration in the reaction zone is maintained by the introduction of fresh catalyst utilizing the hydrocarbon undergoing conversion as the carrying medium.

The importance of the isomeric hydrocarbon has been gradually increasing due primarily to the recent innovations in the chemical industries. Such hydrocarbons, being more active than their normal or mildly branched counterparts, are being utilized as the starting materials in many organic syntheses.

The isomeric hydrocarbon possesses other properties which makes it a particularly desirable product. For instance, it has been found that such compounds have a considerable value in motor fuels since they possess a high octane number and show a large increase in octane number upon the addition of antiknock agents such as tetraethyl lead.

The present invention provides for a process for treating paraffinic hydrocarbons such as butane, pentane, hexane, or mixtures thereof to produce more highly branched paraffins. It is also applicable to the treatment of mixtures containing paraffinic hydrocarbons in substantial amounts such as straight run gasoline or naphtha fractions.

There are many difficulties which arise when treating a paraffinic hydrocarbon or a mixture of paraffinic hydrocarbons with a metallic halide catalyst in the presence of a hydrogen halide promoter. For example, it has been found to be particularly difficult to separate the hydrogen halide from the reaction product so that it may be recirculated for further use. Another difficulty has been in the handling of mixtures of hydrocarbons, catalyst, and hydrogen halide. The pressure desired in the reaction zone is ordinarily lower than that in the fractionating zone thereby necessitating the use of some pressure booster between these zones. However, the condensing of the paraffinic hydrocarbons so a pump may be utilized, introduces the difficulties caused by the deposition of the metallic halide in the valves, condensers, and tower. It is necessary to fractionate at a pressure sufficiently high to effectively separate the hydrogen halide from the reaction products and yet have a sufficient amount of bottoms to keep the metallic halide in solution.

This step assumes considerable importance in the commercial application of the isomerization process since it has been found that the hydrogen halide being used ordinarily contains some impurities such as carbon monoxide which have a deleterious effect upon the catalyst life. By recovering and recycling the hydrogen halide, the amount which must be added is considerably decreased, thereby effecting a considerable increase in catalyst life.

The invention disclosed herein provides a process wherein the difficulties recited above are substantially eliminated.

In one specific embodiment, the present invention comprises a process for the treatment of paraffinic hydrocarbons to increase the branching thereof which comprises contacting said hydrocarbons with an isomerizing catalyst under conditions of temperature and pressure so controlled as to maintain the hydrocarbons in a substantially liquid phase, said hydrocarbon and catalyst forming a mixture containing sufficient catalyst to promote isomerization, introducing said hydrocarbon-catalyst mixture along with the desired amount of hydrogen halide promoter to a packed reaction zone which is maintained under processing conditions so regulated that the reaction mixture is in a substantially vapor phase and the dominating reaction is the formation of isomeric hydrocarbons, removing and condensing the reaction products, pumping the resulting liquid into a fractionating system maintained at a pressure higher than the reaction zone pressure wherein the hydrogen halide and unconverted materials are separated from the reaction mixture and recycled back to the reaction zone.

Figure 2:
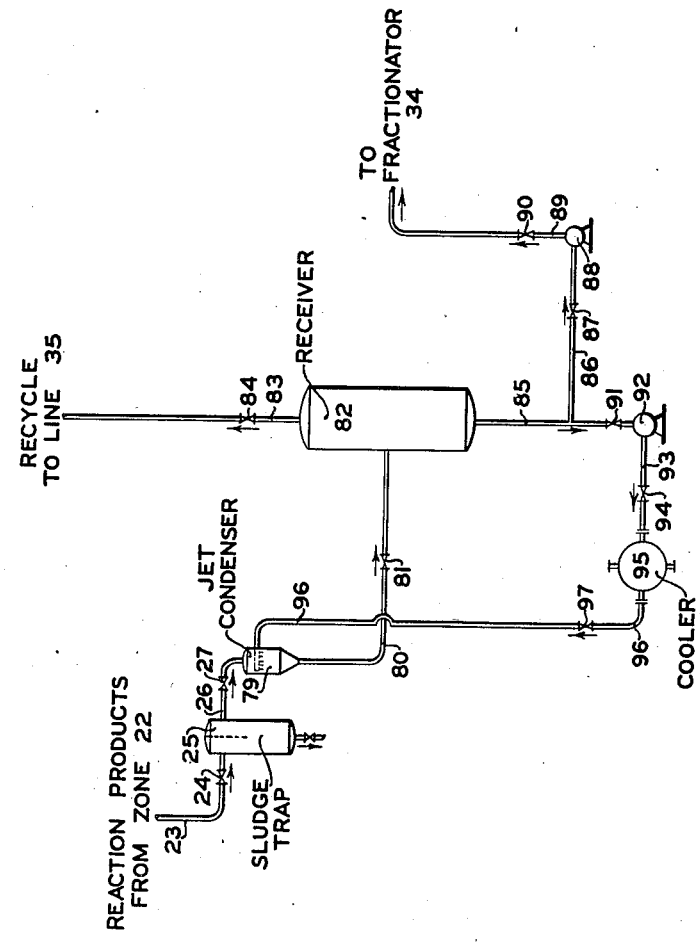

The present invention will be more fully explained by the description of the accompanying diagrammatic drawings wherein Fig. 1 illustrates in conventional side elevation one type of apparatus in which the objects of the invention may be accomplished, and Fig. 2 illustrates a modified arrangement of a portion of the apparatus for condensing the reaction products.

However, it must be remembered that the presentation of this particular apparatus is not intended to limit the invention. There are various other flows which embody its essential features and which fall under its generally broad scope. The drawings have also been simplified by the omission of non-essential parts such as an overhead condenser and other details of the fractionating system.

Referring to the drawings, the charging stock, for example, normal butane, is introduced through line 1 containing valve 2 into pump 3 which discharges through line 4 containing valve 5, into heater zone 6. A portion of the charge may be directed into line 9 where the fresh charge may be commingled with recycle stock formed as hereinafter set forth. The charging stock may be directed so that all or a portion of the feed will pass through line 9 containing valve 10 through heater 11 into line 12 containing valve 13 which discharges into line 16. It is ordinarily desirable, however, to send only a portion of the charging stock through valve 9 with the remainder passing through valve 5. The portion passing through line 4 through valve 5 into heater 6 may be utilized as a heat carrying medium since it will ordinarily be free of any catalyst and therefore may be raised to a higher temperature than the catalyst containing stream and may be used to carry the additional heat necessary to maintain the combined streams at a constant temperature level when they are commingled with the hydrogen halide as hereinafter described. The portion of the feed passing through line 16 passes up through a bed of catalyst disposed in chamber 17. The temperatures and pressures maintained in chamber 17 will be dependent primarily upon the particular catalyst and charging stock being used. However, the pressure will be sufficiently high to maintain the hydrocarbon in chamber 17 in a substantially liquid phase. Maintenance of a substantially liquid phase in this chamber is one of the essential features of this invention since it provides a very flexible means of controlling the amount of catalyst carried out of chamber 17 in the hydrocarbon-catalyst mixture. The amount of catalyst dissolved in the hydrocarbon will, of course, be dependent upon the solubility of the catalyst in said hydrocarbon which in turn will be controlled by temperature. Therefore, it is evident that by controlling the amount of hydrocarbon passing through chamber 17 and the temperature at which said hydrocarbon is maintained, a very easy method of regulating the amount of catalyst carried into the reaction zone is realized. It is evident, therefore, that the temperature at which zone 17 is maintained must necessarily be below the critical temperature of the hydrocarbon being treated. For example, when charging butane, the temperature should not be in excess of about 300° F. The temperature will vary with the type of charging stock being used but will ordinarily be within the range of about 50° to about 400° F.

The catalyst disposed in chamber 17 may be selected from a group comprising the chlorides and bromides of aluminum, zirconium, iron, and zinc used either singly or in mixtures of two or more of the above compounds. Although the above compounds all possess considerable activity, they are not necessarily equivalent. A particularly desirable catalyst is one comprising aluminum chloride used in conjunction with hydrogen chloride.

The hydrocarbon-catalyst mixture leaving chamber 17 passes through line 18 containing valve 19 into line 20 where it is commingled with the hydrogen halide and the remainder of the charging stock which had by-passed chamber 17 through heater 6. The entire mixture passes through line 20 containing valve 21 into reaction zone 22 wherein a substantial proportion of the saturated hydrocarbon, in this case normal butane, is converted to a more highly branched saturated hydrocarbon.

Reaction zone 22 may be a packed chamber containing such materials as porcelain, pumice, firebrick, quartz, activated charcoal, or other activated carbons, diatomaceous earth, kaolin, raw or acid treated clays, silica gel, alumina, magnesia, zirconia, titania, composites of silica with alumina and/or zirconia, and also metals possessing considerable surface such as spongy iron.

On the other hand, this chamber may be a large empty vessel which will increase the time at which the reactants are maintained at the operating conditions to give the particular rate of conversion desired. However, it does not follow that when operating in this manner the results which are obtained are necessarily equivalent to those obtained when using a packed reaction zone under similar operating conditions. The amount of hydrogen halides present in reaction zone 22 will vary with the particular type of catalyst used and the type of hydrocarbon charge but will ordinarily be less than 40 mol per cent of the hydrocarbon-hydrogen halide mixture. It has also been found that the inclusion of hydrogen in the reaction zone considerably increases the effective catalyst life. This is particularly true when dealing with hydrocarbons such as pentane and heavier. The quantity of hydrogen used will be minor, generally less than 20 mol per cent of the hydrocarbon-catalyst mixture.

The temperature at which reaction zone 22 is maintained will ordinarily be within the range of about 50–650° F. and the pressure will be varied accordingly in such a manner that the hydrocarbon will be present in reaction zone 22 in a substantially vapor phase.

The conversion of the hydrocarbons in reaction zone 22 is a mildly exothermic reaction and a sufficient amount of heat is evolved to increase the temperature of this zone above that desired for the optimum conversion. This temperature is, however, maintained substantially constant throughout the reaction zone by the introduction of regulated amounts of recycle stock through line 60 which is branched into lines 61, 63, and 65 containing valves 62, 64, and 66 respectively. The reaction products leave chamber 22 through line 23 containing valve 24 and are introduced into sludge trap 25 wherein the heavy hydrocarbon-catalyst complexes are removed. The remainder of the products leaving sludge trap 25 through line 26 containing valve 27 pass through condenser 28 and a portion of the resulting liquid stream containing the catalyst in solution may be recycled through valve 59 back into the reaction zone as hereinafter set forth. The hydrocarbons passing through condenser 28 are cooled to a sufficiently low temperature to condense the hydrocarbon vapors to produce a liquid which contains the remaining aluminum chloride in solution. This solution leaves condenser 28 through line 29, passing through valve 30 into pump 31 which discharges through line 32 containing valve 33 into fractionator 34. Condenser 28 will consist of an up-flow condenser in which sufficient liquid is held in contact with the condensing vapors to dissolve the catalyst contained therein, thereby preventing its precipitation upon the condenser surfaces. Although not shown in the drawings it may be desirable to interpose a small receiver before pump 31. The gases from this receiver may be directed into line 35. This would prevent any difficulties with vapor binding of pump 31 which might be encountered.

Although this particular type of condenser is well adapted to this invention, it is not necessarily a limiting feature since other methods of condensing the vapors to form a liquid containing the catalyst can be used and are included within the broad scope of this invention.

Another means of condensing the reaction products is shown in Fig. 2. Here reaction products enter sludge trap 25 through line 23 containing valve 24. The sludge-free vapors leave trap 25 through line 26 containing valve 27 and are directed into jet condenser 79 where they are intermixed with cool liquid obtained as hereinafter set forth. The condensed hydrocarbons leave condenser 79 through line 80 containing valve 81 and are directed into receiver 82. The liquid hydrocarbons leave receiver 82 through line 85 and a portion is directed through line 86 containing valve 87 into pump 88 which discharges through line 89 containing valve 90 into fractionating column 34. The remaining portion is withdrawn through valve 91 into pump 92 which discharges through line 93 containing valve 94 into cooler 95. The hydrocarbon stream is cooled to a temperature sufficiently low to enable the use of this stream as a condensing medium for the reaction products leaving sludge trap 25, then the cooled liquid is directed through line 96 containing valve 97 into jet condenser 79 where the cooled stream is intermixed with the reaction products from line 26.

The light gases comprising essentially hydrogen halide which may separate in receiver 82 are withdrawn through line 83 containing valve 84 and are directed into line 35.

The temperature at which the condensed liquid is maintained must be carefully controlled since it is necessary not only to keep the metallic halide catalyst in solution but it is also necessary to keep the hydrogen halide present in solution in order to avoid vapor-lock in pump 31. The hydrocarbons being pumped into fractionator 34 are separated into a light fraction containing the hydrogen chloride which passes overhead to line 35 containing valve 36 back into line 20 where it is commingled with the incoming reactants. Fractionator 34 must be operated under a sufficiently high pressure to enable an effective separation of the hydrogen halide from the hydrocarbons and to produce a sufficient amount of bottoms to maintain the aluminum chloride contained therein in solution to prevent any deposition of catalyst in the bottom of chamber 34. The hydrocarbon stream composed of the isomeric compounds, the unconverted charging stock, and the metallic halide catalyst passes out of fractionator 34 through line 37 containing valve 38 into fractionator 39 wherein the isomeric product is separated from the unconverted and heavier hydrocarbons. The isomeric product is withdrawn through line 40 containing valve 41 and is ordinarily sent to storage. The unconverted and heavier hydrocarbons containing the aluminum chloride solution leave fractionator 39 through line 42 containing valve 43 and the greater portion of this stream passes through valve 52 into the suction of pump 53 which discharges through line 54 containing valve 55 back into line 16 from which it may be directed through line 60 back into reaction zone 22. A portion of this stream may be directed through valve 61 into chamber 17 or a portion may be sent through valve 15 into line 14 which will direct the flow into line 7. In order to avoid a build-up of the undesirable heavier hydrocarbons in the system, a small proportion of the bottoms from column 39 is withdrawn through line 44 containing valve 45 and directed into caustic scrubbing zone 46 wherein the catalyst contained therein is removed by neutralization with the caustic introduced through line 72 and withdrawn through line 73. The catalyst-free hydrocarbons leave scrubber 46 through line 47 containing valve 48 and directed into fractionator 49 wherein the unconverted charging stock is separated from the heavier hydrocarbons and is taken off overhead through line 50 containing valve 51 and is recycled back to the reaction zone. The heavier hydrocarbons are withdrawn through line 68 containing valve 71 and are recovered as a product of the operation.

It is evident that with the continued recycle of the hydrogen halide and lighter hydrocarbons, a build-up of lighter hydrocarbons would result. To avoid this build-up, line 69 containing valve 70 is provided through which a small amount of the overhead of fractionator 34 may be withdrawn, the hydrogen halide removed, and the lighter hydrocarbons recovered as a product of the operation. Any additional hydrogen halide which is necessary during the course of the operation to make up for any loss realized, will be introduced through line 56 containing valve 57. Line 56 will also be used to introduce the hydrogen halide at the start of the operation.

As previously explained a portion of the charging stock may by-pass the catalyst pick up. This eliminates the necessity of contacting the entire catalyst bed with the raw feed. Some charging stocks may contain hydrocarbons such as olefins and aromatics which may have a detrimental effect on the catalyst and by by-passing a portion of the charge through heater 6, the amount of hydrocarbon-catalyst complex formed by the interaction of the catalyst and the unsaturates present in the charge will be minimized. Another method which may be used to prevent the interaction of the undesirable unsaturates in the charging stock and the catalyst is to utilize a portion of the reaction products as the catalyst carrier. This portion may be withdrawn through line 74, through valve 75 into pump 76.

The following example will serve to illustrate the process of my invention:

Normal butane is charged to a plant similar to that described above. Approximately 44% of the butane passes through the aluminum chloride in the saturating chamber, the remainder by-passing this chamber. The normal butane is charged to both saturator and reactor at the rate of about 0.25 volume of liquid butane per volume of catalyst. The aluminum chloride chamber is maintained at a temperature of 180° F. under a pressure of 300 pounds per square inch gauge. The effluent stream from this chamber is commingled with the remainder of the charging stock in a reaction chamber packed with berl saddles. An amount of hydrogen chloride to equal to about 11 mol per cent of the charging stock is added in the reaction zone, which is maintained at a temperature of 220° F. and under a pressure of about 150 pounds gauge. The reaction products are condensed in an upflow condenser and are pumped into the hydrogen chloride fractionator under a pressure of about 400 pounds per square inch gauge. The hydrogen chloride taken overhead is recycled back to the reaction zone. The bottoms containing the catalyst are withdrawn and directed into the isobutane fractionator wherein the isobutane is separated from the normal butane, catalyst, and heavier hydrocarbons. The isobutane is recovered and the overhead condensed, cooled, and recovered as a product of the reaction. The greater portion of the bottoms are withdrawn and recycled back to the reaction zone. A small portion is removed, sent through a caustic washing system and fractionated to separate the normal butane from the heavier hydrocarbons which are withdrawn from the system. The normal butane recovered is recycled back into the reaction zone. The conversion per pass amounts to about 51% isobutane per volume of normal butane charged.

I claim as my invention:

1. A process for the isomerization of saturated hydrocarbons which comprises passing at least a portion of the saturated hydrocarbon in contact with a body of metal halide catalyst under conditions of temperature and pressure such that the hydrocarbon is maintained in substantially liquid phase and dissolves a regulated quantity of the metal halide catalyst, introducing the resultant solution and the remainder of said saturated hydrocarbon into a reaction zone maintained under conditions of temperature and pressure such that the hydrocarbon substantially completely vaporizes and isomerization of the hydrocarbon vapors is effected in the presence of the metal halide catalyst introduced to the reaction zone in said solution.

2. The process of claim 1 further characterized in that a hydrogen halide is supplied to the reaction zone.

3. The process of claim 1 further characterized in that said reaction zone contains a solid packing material.

4. A process for the isomerization of saturated hydrocarbons which comprises separating the hydrocarbon into at least two portions, heating one of said portions while maintaining the same in substantially liquid phase, passing the resultant heated liquid portion in contact with a body of metal halide catalyst under conditions of temperature and pressure such that a regulated quantity of the metal halide catalyst dissolves in the liquid, introducing the resultant solution and the remainder of said saturated hydrocarbon into a reaction zone maintained under conditions of temperature and pressure such that the hydrocarbon substantially completely vaporizes and isomerization of the hydrocarbon vapors is effected in the presence of the metal halide catalyst introduced to the reaction zone in said solution.

5. The process of claim 4 further characterized in that the remainder of said saturated hydrocarbon is independently heated to an isomerizing temperature in a separate heating zone.

6. A process for the isomerization of saturated hydrocarbons which comprises passing at least a portion of the saturated hydrocarbon in contact with a body of metal halide catalyst under conditions of temperature and pressure such that the hydrocarbon is maintained in substantially liquid phase and dissolves a regulated quantity of the metal halide catalyst, introducing the resultant solution into a reaction zone containing a solid packing material, said reaction zone being maintained under conditions of temperature and pressure such that the hydrocarbon substantially completely vaporizes and isomerization of the hydrocarbon vapors is effected in the presence of the metal halide catalyst introduced to the reaction zone in said solution.

7. The process of claim 6 further characterized in that a hydrogen halide is supplied to the reaction zone.

8. The process of claim 6 further characterized in that the saturated hydrocarbon comprises normal butane.

9. The process of claim 6 further characterized in that the metal halide catalyst comprises aluminum chloride.

10. A process for the isomerization of paraffins which comprises heating at least a portion of the paraffin to a temperature of from about 50 to about 300° F. while maintaining the same in substantially liquid phase, passing the resultant heated liquid portion in contact with a body of metal halide catalyst under conditions of temperature and pressure such that the paraffin remains liquid and dissolves a regulated quantity of the metal halide catalyst, introducing the resultant solution, the remainder of the paraffin and a hydrogen halide to a reaction zone containing a solid packing material, said reaction zone being maintained under conditions of temperature and pressure such that the paraffin substantially completely vaporizes and isomerization of the paraffin vapors is effected in the presence of the metal halide catalyst introduced to the reaction zone in said solution.

11. The process of claim 10 further characterized in that the paraffin comprises normal butane, the metal halide catalyst comprises aluminum chloride and the hydrogen halide comprises hydrogen chloride.

12. The process of claim 10 further characterized in that the conversion products formed in said reaction zone which contain some metal halide catalyst, after removal are subjected to cooling and condensation, hydrogen halide is separated from resultant condensate and returned to the reaction zone.

13. A process for the isomerization of paraffins which comprises heating at least a portion of the paraffin to a temperature of from about 50 to about 300° F. while maintaining the same in substantially liquid phase, passing the resultant heated liquid portion in contact with a body of metal halide catalyst under conditions of temperature and pressure such that the paraffin remains liquid and dissolves a regulated quantity of the metal halide catalyst, introducing the resultant solution, the remainder of the paraffin and a hydrogen halide to a reaction zone containing a solid packing material, said reaction zone being maintained under conditions of temperature and pressure such that the paraffin substantially completely vaporizes and isomerization of the paraffin vapors is effected in the presence of the metal halide catalyst introduced to the reaction zone in said solution, removing resultant conversion products from the reaction zone, subjecting said products to cooling and condensation, separating hydrogen halide from resulting condensate, returning the separated hydrogen halide to the reaction zone, fractionating at least a portion of the remaining condensate to separate an isoparaffin fraction and to form reflux condensate and returning at least a portion of the reflux condensate to the reaction zone.

14. The process of claim 13 further characterized in that a portion of said remaining condensate is subjected to further cooling and the condensate thus cooled is supplied to the cooling and condensing step.

CHARLES G. DRYER.